United States Patent [19]
Idogawa

[11] Patent Number: 6,160,035
[45] Date of Patent: Dec. 12, 2000

[54] OIL-BASE PIGMENT INK COMPOSITION FOR WRITING TOOLS

[75] Inventor: Hiroyuki Idogawa, Urawa, Japan

[73] Assignee: Mitsubishi Pencil Kabushiki Kaisha, Tokyo, Japan

[21] Appl. No.: 09/171,147

[22] PCT Filed: Apr. 14, 1997

[86] PCT No.: PCT/JP97/01281

§ 371 Date: Oct. 9, 1998

§ 102(e) Date: Oct. 9, 1998

[87] PCT Pub. No.: WO97/39070

PCT Pub. Date: Oct. 23, 1997

[30] Foreign Application Priority Data

| Apr. 15, 1996 | [JP] | Japan | 8-092588 |
| Apr. 19, 1996 | [JP] | Japan | 8-098599 |
| May 14, 1996 | [JP] | Japan | 8-118966 |
| May 14, 1996 | [JP] | Japan | 8-118967 |

[51] Int. Cl.$^7$ .................. C09D 11/16; C08F 226/02; C08F 226/06; C08L 39/00; C08L 39/04
[52] U.S. Cl. ................ 523/161; 524/555; 526/263
[58] Field of Search ................ 523/160, 161; 526/312, 329.2, 263, 264; 106/31.6, 31.64, 31.75, 31.85, 31.93; 524/555, 562

[56] References Cited

U.S. PATENT DOCUMENTS

| 3,910,862 | 10/1975 | Barabas et al. ............... 525/326.9 |
| 4,304,703 | 12/1981 | Das ............................. 524/458 |
| 4,339,365 | 7/1982 | Becher et al. ............... 523/400 |
| 4,529,787 | 7/1985 | Schmidt et al. ............. 526/209 |
| 4,734,137 | 3/1988 | Kasahara et al. ........... 106/497 |
| 5,324,764 | 6/1994 | Fujita et al. ................. 524/377 |
| 5,667,571 | 9/1997 | Ono et al. .................... 106/34.48 |
| 5,868,511 | 2/1999 | Osada ......................... 401/209 |
| 6,025,317 | 2/2000 | Stein et al. ................... 510/360 |

FOREIGN PATENT DOCUMENTS 40100607  1/1989  Japan.

*Primary Examiner*—Vasu Jagannathan
*Assistant Examiner*—Callie E. Shosho
*Attorney, Agent, or Firm*—Darby & Darby

[57] ABSTRACT

The oil base pigment ink composition for writing tools comprising at least a pigment, a basic resin having an amino group and an alcohol base solvent and/or a glycol ether base solvent, wherein the basic resin described above is a resin copolymerized monomers containing at least one of a vinyl monomer having a heterocyclic amino group, a vinyl monomer having an aliphatic primary amino group, a vinyl monomer having an aliphatic secondary amino group or a vinyl monomer having an aliphatic tertiary amino group and has preferably a weight average molecular weight of 50000 or less. The pigment is preferably carbon black, particularly preferably carbon black having a pH of 6 or less.

7 Claims, No Drawings

OIL-BASE PIGMENT INK COMPOSITION FOR WRITING TOOLS

TECHNICAL FIELD

The present invention relates to an oil base pigment ink composition for writing tools, more specifically to an oil base pigment ink composition for writing tools which has fluidity suitable to writing tools having a discharge mechanism making use of a capillary phenomenon and is excellent in dispersion stability and which has such characteristics as causing no clogging at felt-made pen points, fiber-made pen points and plastic-made pen points.

BACKGROUND ART

An oil base ink can write on both surfaces of ink-absorbing materials such as paper and cloth and ink-non-absorbing materials such as plastics, glass and metal. In addition, since it has a quick drying property, it is widely used as an oil base ink for writing tools.

In particular, since an ink using a pigment as a colorant is excellent in handwriting fastness, it is generally known as a paint marker and used not only in homes, schools and offices but also in various industrial fields. Carbon black is used as a pigment for a black ink.

However, since an oil base pigment ink composition using carbon black does not provide a sufficient discharge amount to writing tools having a discharge mechanism making use of a capillary phenomenon because of a high viscosity thereof and causes writing starving, a valve mechanism is employed in the paint marker to secure the discharge amount.

The ink described above causes phenomena such as flocculation and precipitation of carbon black while being used over a long period of time, which results in deteriorating the fluidity and bringing about clogging at a pen point. Accordingly, conventional paint markers employ a redispersing method in which a stirring member such as a metal ball is put into an ink reservoir together with an ink and have a complicated structure in combination with a valve mechanism, which has brought about problems that many parts are required and that the assembly work steps are complicated and the cost is high.

DISCLOSURE OF THE INVENTION

An object of the present invention is to provide an oil base pigment ink composition for writing tools which does not have to employ such complicated structure as those of conventional paint markers. That is, an object of the present invention is to provide an oil base pigment ink composition for writing tools which has fluidity suitable to writing tools having a discharge mechanism making use of a capillary phenomenon and is excellent in dispersion stability and which has such characteristics as causing no clogging at felt-made pen points, fiber-made pen points and plastic-made pen points.

The present inventors have successfully obtained an intended oil base pigment ink composition for writing tools described above by incorporating at least a pigment, a basic resin having an amino group and a solvent and have come to complete the present invention.

That is, the oil base pigment ink composition for writing tools of the present invention is characterized by comprising at least a pigment, a basic resin and an alcohol base solvent and/or a glycol ether base solvent.

The dye described above is preferably carbon black. The basic resin described above is a resin copolymerized monomers containing at least one selected from a vinyl monomer having a heterocyclic amino group, a vinyl monomer having an aliphatic primary amino group, a vinyl monomer having an aliphatic secondary amino group or a vinyl monomer having an aliphatic tertiary amino group and is preferably a copolymer resin having a weight average molecular weight of 50000 or less.

It is not clear why the oil base pigment ink composition for writing tools of the present invention has good fluidity and excellent dispersibility and does not cause clogging at a pen point, but it is presumed that the adsorption of the resin onto the surface of carbon black is particularly strengthened by interaction among the respective components of the pigment, the basic resin and the alcohol base solvent and/or the glycol ether base solvent and by virtue of the above specific basic resin used in the present invention, which results in causing the effects of dispersibility and precipitation prevention to be revealed, so that the ink is provided with an excellent fluidity and dispersion stability and does not cause clogging at a pen point without settling down carbon black even after storage over a long period of time.

The present invention provides an excellent oil base pigment ink composition for writing tools having excellent fluidity and dispersibility and causing no clogging at a pen point even after the ink has been stored over a long period of time and can suitably be applied as well to writing tools having a paint marker structure.

BEST MODE FOR CARRYING OUT THE INVENTION

The embodiment of the present invention shall be explained below in detail.

The pigment (colorant) used for the ink composition of the present invention includes, for example, carbon black.

Carbon black used as a pigment in the present invention shall not specifically be restricted, and carbon blacks used for inks for commercial writing tools can be used. In order to obtain an ink which has fluidity suitable for intended writing tools and is excellent in dispersion stability and which is less liable to cause clogging at a pen point, carbon black having a pH of 6 or less is more preferably used.

Carbon black having a pH of 6 or more makes the dispersibility insufficient and increases the viscosity, which results in providing no fluidity suited for the intended writing tools. Further, clogging is liable to be caused at a pen point when an ink is stored over a long period of time, and therefore carbon black having a pH of 6 or less is preferred.

Given are, for example, "Regal 415R", "Regal 250R", "Regal 400R", "Mogul L", "Monarch 460" and "Monarch 1000" each of which is manufactured by Cabot Co., Ltd., "Printex 25", "Printex 35", "Printex 45", "Special Black 4", "Special Black 250" and "Special Black 350" each of which is manufactured by Degussa AG., and "#45L", "#50", "#900", "#2300", "#2350", "#970", "#1000", "MA7", "MA11" and "MCF88" each of which is manufactured by Mitsubishi Chemical Co., Ltd. They can be used solely or in a combination of two or more kinds thereof.

The using amount thereof is preferably 3 to 20% by weight based on the whole amount of the ink composition.

The basic resin used for the ink composition of the present invention is effective as a dispersant, a precipitation inhibitor and a binder for carbon black.

The basic resin used in the present invention is a resin copolymerized monomers containing at least one selected from a vinyl monomer having a heterocyclic amino group, a vinyl monomer having an aliphatic primary amino group, a vinyl monomer having an aliphatic secondary amino group or a vinyl monomer having an aliphatic tertiary amino group. Preferred is a resin copolymerized monomers containing the vinyl monomer having a heterocyclic amino group as an essential component.

In the case where the basic resin described above is a resin copolymerized monomers containing no vinyl monomer having a heterocyclic amino group and containing a vinyl monomer having an aliphatic amino group, preferred is the copolymer from the monomers containing at least the vinyl monomer having an aliphatic tertiary amino group and the vinyl monomer having an aliphatic primary amino group and/or aliphatic secondary amino group.

The basic resin described above is preferably the copolymer having a weight average molecular weight of 50000 or less.

The vinyl monomers having an aliphatic tertiary amino group include, for example, dimethylaminoethyl acrylate, diethylaminoethyl acrylate, dimethylaminoethyl methacrylate and diethylaminoethyl methacrylate. They are desirably incorporated into the copolymer component in a proportion of 5 to 70 mole %, preferably 10 to 60 mole %. The role of this vinyl monomer having an aliphatic tertiary amino group is not clear, but it is considered to aid principally the copolymerized resin to be dissolved in an alcohol base solvent or a glycol ether base solvent.

The vinyl monomers having an aliphatic primary amino group and an aliphatic secondary amino group include, for example, allylamine, acrylamide and methacrylamide, and they are desirably incorporated into the copolymer component in a proportion of 0.5 to 15 mole %, preferably 1 to 10 mole %. The roles of the vinyl monomers having an aliphatic primary amino group and an aliphatic secondary amino group are not clear either, but it is considered to provide mainly the dispersibility for carbon black.

In the case where the basic resin is a copolymer resin having a heterocyclic amino group, the vinyl monomers having a heterocyclic amino group include, for example, vinylpyrrolidone, 2-vinylpyridine, 4-vinylpyridine, 1-vinylimidazole and 2-vinylpyrazine, and they are desirably incorporated into the copolymer component in a proportion of 5 to 100 mole %, preferably 10 to 95 mole %. The role of this vinyl monomer having a heterocyclic amino group is not clear, but it is considered to aid principally the copolymerized resin to be dissolved in an alcohol base solvent or a glycol ether base solvent as well as to provide the dispersibility for carbon black.

The aliphatic vinyl monomers used for the copolymer component containing both the vinyl monomer having a heterocyclic amino group and the vinyl monomer having an aliphatic amino group include the preceding vinyl monomers having an aliphatic amino group. In particular, the vinyl monomers having an aliphatic primary or secondary amino group (for example, allylamine) are preferred. They are desirably incorporated into the copolymer component in a proportion of 0.5 to 15 mole %, preferably 1 to 10 mole %.

Styrene copolymers can be used as basic resins having a heterocyclic amino group. In this case, styrene is desirably incorporated into the copolymer component in a proportion of 5 to 70 mole %, preferably 10 to 60 mole %. In the basic resin having a heterocyclic amino group, the roles of these vinyl monomers having a heterocyclic amino group and styrene are not cleary, but it is considered to provide mainly the excellent dispersibility for carbon black.

Further, in addition thereto, non-functional vinyl monomers such as methyl acrylate, ethyl acrylate, n-butyl acrylate, 2-ethylhexyl acrylate, methyl methacrylate, ethyl methacrylate, n-butyl methacrylate and 2-ethylhexyl methacrylate can suitably be incorporated into the copolymer component if necessary.

On the other hand, an ink suitable to a writing tool having a discharge mechanism making use of a capillary phenomenon has a viscosity of 20 mPa·s or less (25° C.). Accordingly, the copolymer described above has preferably a weight average molecular weight of 50,000 or less, and the using amount thereof is preferably 1 to 20% by weight based on the whole amount of the ink composition, though it is varied depending on the weight average molecular weight.

The solvents used for the ink composition of the present invention include alcohol base solvents and/or glycol ether base solvents.

The alcohol base solvents include, for example, methanol, ethanol, n-propyl alcohol, isopropyl alcohol, n-butyl alcohol, sec-butyl alcohol, tert-butyl alcohol, n-amyl alcohol, isoamyl alcohol, sec-amyl alcohol and n-hexanol.

The glycol ether base solvents include, for example, methyl cellosolve, ethyl cellosolve, isopropyl cellosolve, butyl cellosolve and propylene glycol monomethyl ether.

In addition thereto, surfactants, dispersion aids, rust preventives and lubricants can suitably be selected and used for the ink composition of the present invention, if necessary.

Conventionally known methods can be employed as a method for producing the ink composition of the present invention.

The ink composition can readily be obtained by mixing and dispersing the respective components described above by means of dispersing machines such as homomixers, ball mills, beads mills, homogenizers, sand mills and roll mills.

EXAMPLES

The present invention shall be explained below in detail with reference to examples and comparative examples but the present invention shall by no means be restricted by these examples.

The following physical property tests were carried out for the inks obtained in the following examples and comparative examples.

(1) Fluidity

The fluidity was evaluated by a value of viscosity measured at 25° C. with a cone and plate viscometer. The inks having a viscosity of 20 mPa·s or less show an excellent fluidity.

(2) Dispersibility

The average particle diameters of carbon blacks dispersed in the inks were determined by means of a laser scattering type particle-size distribution analyzer, and the dispersibility was evaluated by the value thus obtained.

The carbon blacks having a small average particle size, particularly 150 nm or less show an excellent dispersibility.

(3) Long-Term Preservability

The respective inks were charged into a felt tip pen having an acrylic-resin-made-fiber pen point, and the pen was used for writing after having been left for standing for three months, and the preservability was evaluated by observing the status thereof with eyes:

⊚: No clogging and good handwriting

○: Slight clogging caused but no starving in handwriting

×: Much clogging caused and starving in handwriting

Example 1

Ten parts by weight of a mixed monomer having a blending ratio shown in the following Table 1, that is, 50 mole % of dimethylaminoethyl methacrylate, 4 mole % of allylamine and 46 mole % of n-butyl methacrylate were added to 80 parts by weight of a solvent of ethanol, and solution polymerization was carried out with azobisdimethylvaleronitrile used as a catalyst, whereby a copolymer solution having a weight average molecular weight of 9800 was obtained.

Ninety parts by weight of this solution and 10 parts by weight of carbon black "#1000" (manufactured by Mitsubishi Chemical Co., Ltd.) were kneaded and dispersed for one hour with a sand mill to prepare an oil base pigment ink composition of the present invention for writing tools.

Examples 2 to 3 and Comparative Example 1

The respective oil base pigment ink compositions for writing tools were prepared in the same manner as in Example 1. The mixing ratios of the respective components, the solvents, the carbon blacks and the ink blending ratios are shown in the following Table 1.

The test results of the respective inks thus obtained are shown in the following Table 1.

TABLE 1

|  | Example |  |  | Comp. Example |
|---|---|---|---|---|
|  | 1 | 2 | 3 | 1 |
| Basic resin Composition (mole %): |  |  |  |  |
| Dimethylaminoethyl methacrylate | 50 | 30 |  |  |
| Diethylaminoethyl methacrylate |  |  | 40 |  |
| Allylamine | 4 | 5 | 3 |  |
| n-Butyl methacrylate | 46 |  | 40 | 70 |
| 2-Ethylhexyl acrylate |  | 65 | 17 | 30 |
| Physical property: |  |  |  |  |
| Weight-average molecular weight | 9800 | 13000 | 12000 | 12000 |
| Oil pigment ink for writing tools Blend composition (% by weight): |  |  |  |  |
| Kind of carbon black |  |  |  |  |
| #1000 (pH = 3)          *1 | 10 |  |  |  |
| MA100 (pH = 3.5)        *1 |  | 10 |  |  |
| Regal 400R (pH = 4)     *2 |  |  | 10 | 10 |
| Printex 35 (pH = 9)     *3 |  |  |  |  |
| Resin | 10 | 10 | 8 | 8 |
| Ethanol | 80 |  |  |  |
| Isopropyl alcohol |  | 80 |  |  |
| Propylene glycol monomethyl ether |  |  | 82 | 82 |
| Characteristics: |  |  |  |  |
| Fluidity (viscosity, mPa · s) | 4 | 5 | 3.9 | 138 |
| Dispersibility (average particle size, nm) | 98 | 109 | 101 | 492 |
| Long-term preservability | ⊙ | ⊙ | ⊙ | x |

*1: manufactured by Mitsubishi Chemical Co., Ltd.
*2: manufactured by Cabot Co., Ltd.
*3: manufactured by Degussa AG.

As apparent from the results shown in Table 1, it has been confirmed that the oil base pigment ink compositions which are excellent in fluidity and dispersion stability as well as long-term storage stability are provided in Examples 1 to 3 falling in the scope of the present invention.

In contrast with this, Comparative Example 1 is an example in which the vinyl monomers having an aliphatic primary or secondary amino group and an aliphatic tertiary amino group are not used, and it has been confirmed that the fluidity and the dispersibility are inferior and the long-term storage stability is deteriorated as well and that the intended oil base pigment composition can not be obtained.

Example 4

Ten parts by weight of a mixed monomer having a blending ratio shown in the following Table 2, that is, 50 mole % of vinylpyrrolidone and 50 mole % of n-butyl methacrylate were added to 80 parts by weight of a solvent of ethanol, and solution polymerization was carried out with azobisdimethylvaleronitrile used as a catalyst, whereby a copolymer solution having a weight average molecular weight of 12000 was obtained.

Ninety parts by weight of this solution and 10 parts by weight of carbon black "#1000" (manufactured by Mitsubishi Chemical Co., Ltd.) were kneaded and dispersed for one hour with a sand mill to prepare an oil base pigment ink composition of the present invention for writing tools.

Examples 5 to 6 and Comparative Example 2

The respective oil base pigment ink compositions for writing tools were prepared in the same manner as in Example 4. The mixing ratios of the respective components, the solvents, the carbon blacks and the ink blending ratios are shown in the following Table 2.

The physical property tests of the inks obtained in Examples 4 to 6 and Comparative Example 2 were carried out, and the results thereof are shown in Table 2.

TABLE 2

|  | Example |  |  | Comp. Example |
|---|---|---|---|---|
|  | 4 | 9 | 6 | 2 |
| Basic resin Composition (mole %): |  |  |  |  |
| Vinylpyrrolidone | 50 | 50 | 40 |  |
| Dimethylaminoethyl methacrylate |  |  |  |  |
| n-Butyl methacrylate | 50 | 30 | 30 | 70 |
| 2-Ethylhexyl acrylate |  | 20 | 30 | 30 |
| Physical property: |  |  |  |  |
| Weight-average molecular weight | 12000 | 11000 | 9800 | 12000 |
| Oil pigment ink for writing tools Blend composition (% by weight): |  |  |  |  |
| Kind of carbon black |  |  |  |  |
| #1000 (pH = 3)          *1 | 10 |  |  |  |
| MA100 (pH = 3.5)        *1 |  | 10 |  |  |
| Regal 415R (pH = 9.5)   *2 |  |  | 10 | 10 |
| Resin | 10 | 10 | 8 | 8 |
| Ethanol | 80 |  |  |  |
| Isopropyl alcohol |  |  | 82 | 82 |
| Propylene glycol monomethyl ether |  | 80 |  |  |
| Characteristics: |  |  |  |  |
| Fluidity (viscosity, mpa · s) | 4.1 | 4.2 | 3.9 | 149 |
| Dispersibility (average particle size, nm) | 102 | 109 | 101 | 483 |
| Long-term preservability | ⊙ | ⊙ | ⊙ | x |

*1: manufactured by Mitsubishi Chemical Co., Ltd.
*2: manufactured by Cabot Co., Ltd.

As apparent from the results shown in Table 2, it has been confirmed that the oil base pigment ink compositions which are excellent in fluidity and dispersion stability as well as long-term storage stability as compared with those of Comparative Example 2 are provided in Examples 4 to 6 falling in the scope of the present invention.

Observing individually, carbon blacks having a pH of 6 or less were used in Examples 4 and 5, and therefore the fluidity and the dispersion stability as well as the long-term storage stability are excellent. Carbon black having a pH of 9.5 was used in Example 6, and it has been confirmed that only the long-term storage stability is a little low as compared with those of the ink compositions prepared in Examples 4 and 5 using carbon blacks having a pH of 6 or less but that does not effect the writing performance.

Comparative Example 2 is an example in which the vinyl monomer having an amino group is not used, and it has been confirmed that the fluidity and the dispersibility are inferior and the long-term storage stability is deteriorated as well in Comparative Example 2 falling out of the scope of the present invention and that the intended oil base pigment ink composition can not be obtained.

Example 7

Ten parts by weight of a mixed monomer having a blending ratio shown in the following Table 3, that is, 50 mole % of vinylpyrrolidone, 5 mole % of allylamine and 45 mole % of n-butyl methacrylate were added to 80 parts by weight of a solvent of ethanol, and solution polymerization was carried out with azobisdimethylvaleronitrile used as a catalyst, whereby a copolymer solution having a weight average molecular weight of 11000 was obtained.

Ninety parts by weight of this solution and 10 parts by weight of carbon black Special Black 4 (manufactured by Degussa AG.) were kneaded and dispersed for one hour with a sand mill to prepare an oil base pigment ink composition of the present invention for writing tools.

Example 8 and Comparative Example 3

The respective oil base pigment ink compositions for writing tools were prepared in the same manner as in Example 7. The mixing ratios of the respective components, the solvents, the carbon blacks and the ink blending ratios are shown in the following Table 3.

The physical property tests of the inks obtained in Examples 7 to 8 and Comparative Example 3 were carried out, and the results thereof are shown in Table 3.

TABLE 3

|  | Example | | Comp. Example |
|---|---|---|---|
|  | 7 | 8 | 3 |
| Basic resin Composition (mole %): | | | |
| Vinylpyrrolidone | 50 | 50 |  |
| Allylamine | 5 | 5 |  |
| n-Butyl methacrylate | 45 | 30 | 70 |
| 2-Ethylhexyl acrylate |  | 15 | 30 |
| Physical property: | | | |
| Weight-average molecular weight | 11000 | 12000 | 12000 |
| Oil pigment ink for writing tools Blend composition (% by weight): | | | |
| Kind of carbon black | | | |
| Special Black 4 (pH = 3)   *1 | 10 | | |
| #1000 (pH = 3)   *2 |  | 10 |  |
| MCF88 (pH = 8)   *2 |  |  | 10 |
| Resin | 10 | 10 | 10 |
| Ethanol | 80 |  |  |
| Isopropyl alcohol |  |  | 80 |
| Propylene glycol monomethyl ether |  | 80 |  |
| Characteristics: | | | |
| Fluidity (viscosity mPa · s) | 4.3 | 3.9 | 112 |

TABLE 3-continued

|  | Example | | Comp. Example |
|---|---|---|---|
|  | 7 | 8 | 3 |
| Dispersibility (average particle size, nm) | 114 | 107 | 394 |
| Long-term preservability | ◉ | ◉ | x |

*1: manufactured by Degussa AG.
*2: manufactured by Mitsubishi Chemical Co., Ltd.

As apparent from the results shown in Table 3, it has been confirmed that the oil base pigment ink compositions which are excellent in fluidity and dispersion stability as well as long-term storage stability are provided in Examples 7 to 8 falling in the scope of the present invention.

In contrast with this, Comparative Example 3 is an example in which neither vinyl monomer having a heterocyclic amino group nor vinyl monomer having an aliphatic amino group is used, and it has been confirmed that the fluidity and the dispersibility are inferior and the long-term storage stability is deteriorated as well and that the intended oil base pigment ink composition can not be obtained.

Example 9

Ten parts by weight of a mixed monomer having a blending ratio shown in the following Table 4, that is, 50 mole % of vinylpyrrolidone, 30 mole % of styrene and 20 mole % of n-butyl methacrylate were added to 80 parts by weight of a solvent of ethanol, and solution polymerization was carried out with azobisdimethylvaleronitrile used as a catalyst, whereby a copolymer solution having a weight-average molecular weight of 12000 was obtained.

Ninety parts by weight of this solution and 10 parts by weight of carbon black "#1000" (manufactured by Mitsubishi Chemical Co., Ltd.) were kneaded and dispersed for one hour with a sand mill to prepare the oil base pigment ink composition of the present invention for writing tools.

Example 10 and Comparative Example 4

The respective oil base pigment ink compositions for writing tools were prepared in the same manner as in Example 9. The mixing ratios of the respective components, the solvents, and the carbon blacks and the ink blending ratios are shown in the following Table 4.

The physical property tests of the inks obtained in Examples 9 to 10 and Comparative Example 4 were carried out, and the results thereof are shown in Table 4.

TABLE 4

|  | Example | | Comp. Example |
|---|---|---|---|
|  | 9 | 10 | 4 |
| Basic resin Composition (mole %): | | | |
| Vinylpyrrolidone | 50 | 50 |  |
| Styrene | 30 | 5 | 20 |
| n-Butyl methacrylate | 20 | 30 | 70 |
| 2-Ethylhexyl acrylate |  | 15 | 10 |
| Physical property: | | | |
| Weight-average molecular weight | 12000 | 12000 | 13000 |
| Oil pigment ink for writing tools | | | |

TABLE 4-continued

|  | Example | | Comp. Example |
|---|---|---|---|
|  | 9 | 10 | 4 |
| Blend composition (% by weight): | | | |
| Kind of carbon black | | | |
| #1000 (pH = 3)   *1 | 10 | | |
| MCF88 (pH = 8)   *1 | | 10 | 10 |
| Resin | 10 | 10 | 10 |
| Ethanol | 80 | | |
| Isopropyl alcohol | | | 80 |
| Propylene glycol monomethyl ether | | 80 | |
| Characteristics: | | | |
| Fluidity (viscosity mPa · s) | 4.1 | 3.8 | 31 |
| Dispersibility (average particle size, nm) | 109 | 104 | 201 |
| Long-term preservability | ⊚ | ⊚ | x |

*1: manufactured by Mitsubishi Chemical Co., Ltd.

As apparent from the results shown in Table 4, it has been confirmed that the oil base pigment ink compositions which are excellent in fluidity and dispersion stability as well as long-term storage stability are provided in Examples 9 to 10 falling in the scope of the present invention.

In contrast with this, Comparative Example 4 is an example in which the vinyl monomer having an amino group is not used, and it has been confirmed that in Comparative Example 4 falling out of the scope of the present invention, the fluidity and the dispersibility are inferior and the long-term storage stability is deteriorated as well and that the intended oil base pigment ink composition can not be obtained.

INDUSTRIAL APPLICABILITY

The oil base pigment ink compositions of the present invention are suited for writing tools having a discharge mechanism making use of a capillary phenomenon.

What is claimed is:

1. An oil base pigment ink composition for writing tools comprising at least a pigment, a basic resin having an amino group and an alcohol base solvent and/or a glycol ether base solvent, wherein said basic resin is a resin copolymerized from monomers containing a vinyl monomer and an allylamine monomer.

2. The oil base pigment ink composition for writing tools as described in claim 1, said monomers further comprising a vinyl monomer having a heterocyclic amino group.

3. The oil base pigment ink composition for writing tools as described in claim 2, said monomers comprising a vinyl monomer having a heterocyclic amino group and styrene.

4. The oil base pigment ink composition for writing tools as described in claim 3, wherein the basic resin having an amino group has a weight average molecular weight of 50000 or less.

5. The oil base pigment ink composition for writing tools as described in claim 3, wherein the pigment is carbon black.

6. The oil base pigment ink composition for writing tools as described in claim 5, wherein the carbon black has a pH of 6 or less.

7. The oil base pigment ink composition for writing tools as described in claim 1, said monomers further comprising a vinyl monomer having an aliphatic tertiary amino group and a vinyl monomer having an aliphatic primary amino group and/or aliphatic secondary amino group.

* * * * *